US008123309B2

(12) United States Patent  (10) Patent No.: US 8,123,309 B2
Thomas et al. (45) Date of Patent: Feb. 28, 2012

(54) DUAL SEAL BRAKE CONTROL VALVE

(75) Inventors: Marc S. Thomas, Dexter, NY (US); Deepak Kumar, Kingston (CA)

(73) Assignee: New York Air Brake Corporation, Watertown, NY (US)

( * ) Notice: Subject to any disclaimer, the term of this patent is extended or adjusted under 35 U.S.C. 154(b) by 1162 days.

(21) Appl. No.: 11/876,846

(22) Filed: Oct. 23, 2007

(65) Prior Publication Data

US 2009/0102279 A1  Apr. 23, 2009

(51) Int. Cl.
*B60T 17/06* (2006.01)
(52) U.S. Cl. .............................. 303/128; 303/39; 303/30
(58) Field of Classification Search .............. 303/7, 127, 303/128, 27–30, 37, 39, 87, DIG. 1, DIG. 2; 251/282; 137/605–607, 625.17, 625.25, 137/625.67–625.69
See application file for complete search history.

(56) References Cited

U.S. PATENT DOCUMENTS

| | | | | |
|---|---|---|---|---|
| 3,524,683 A | * | 8/1970 | Stelzer | 313/318.05 |
| 4,025,126 A | * | 5/1977 | Wilson | 303/33 |
| 5,387,030 A | * | 2/1995 | Gayfer et al. | 303/30 |
| 5,564,794 A | * | 10/1996 | Hart | 303/3 |
| 5,941,280 A | * | 8/1999 | Hart et al. | 137/605 |
| 6,227,520 B1 | * | 5/2001 | Huber, Jr. | 251/61.5 |
| 6,286,912 B1 | * | 9/2001 | Sturgess | 303/7 |
| 6,709,070 B1 | * | 3/2004 | Wright et al. | 303/81 |
| 7,429,088 B1 | * | 9/2008 | Thomas et al. | 303/30 |
| 2005/0279959 A1 | * | 12/2005 | Gessaman | 251/282 |

* cited by examiner

*Primary Examiner* — Bradley King
*Assistant Examiner* — Thomas Irvin
(74) *Attorney, Agent, or Firm* — Barnes & Thornburg LLP

(57) ABSTRACT

A brake control valve includes a housing, a quick braking chamber and a piston subject to brake pipe pressure on one side of the piston. A bore in the housing connects the quick braking chamber at a first end and the one side of the piston at a second end. A first valve is in the housing at the first end of the bore. A first operator is in the bore for opening the first valve for a range of positions of the piston. The bore has a first portion of a first diameter and a second portion of a second diameter larger than the first diameter. The first bore portion connects the one side of the piston to the second bore portion. A first operator in the bore is connected to the piston. A seal on the first operator is dimensioned to form a seal with the first bore portion and not with the second bore portion. The seal is located on the operator to lie in the first bore portion for a first segment of the range of piston positions and to lie in the second bore portion for a second segment of the range of piston positions.

7 Claims, 3 Drawing Sheets

DUAL SEAL BRAKE CONTROL VALVE

BACKGROUND AND SUMMARY OF THE DISCLOSURE

The present disclosure relates generally to brake control valve systems for operating a vehicle's air brakes, in response to brake pipe pressure in a brake pipe, and more specifically to a brake control valve system which is insensitive to increased mechanical vibrations and brake pipe pressure fluctuations or noise.

Brake control valve systems for a vehicle having air brakes generally include a brake control valve responsive to the brake pipe pressure in a brake pipe to operate the brakes of a vehicle. For a reduction of brake pipe pressure, the brakes are proportionally applied. For an increase in brake pipe pressure, the brakes may be released totally or gradually. In the American Association of Railroads AAR system, the brake control valves include a service section and an emergency section which are responsive respectfully to a service rate of reduction and emergency rate of reduction to apply the brakes appropriately. Each section includes a separate diaphragm or piston responsive to the brake pipe pressure on one side and a reference pressure on the other. Not only must the brake control valve differentiate between a service and an emergency application, but also must react in a specific amount of time to apply the brakes and propagate the signal throughout the brake system.

Historically, the control valves have been designed to be substantially insensitive to pneumatic noise signals in the brake pipe which could cause undesired emergency (UDE) braking and undesired release (UDR). Various mechanisms have been used, for example, chokes or restrictions interconnecting the brake pipe and the reference chamber of the diaphragms, to accommodate pneumatic noise. One of the sources of the pneumatic noise or shock is the mechanical vibration of the vehicle. A major identifiable source of this mechanical vibration is in the longitudinal motion or slack action between the different cars of the vehicle or train. The insensitivity or the stability built into the brake control valves to accommodate the pneumatic noise or shock have, unbeknownst to the designers, accommodated and therefore masked, mechanically produced vibration on the brake control valve which can produce undesired minimum (UDM) service braking.

With the introduction of aluminum and other building materials as well as the modification of other portions of a car of a train, the empty car gross weight has been reduced from the range of 55,000 to 65,000 lbs. to 40,000 to 45,000 lbs. For these lighter cars, it has been noticed that the control brake valves had been experiencing an undesired minimum service application.

Experimentation has shown that the undesired minimum service application is a function of the horizontal G-forces and its duration. For a low horizontal G-force in the range of 5 to 7 Gs, typical duration of 2.6 to 2.7 milliseconds generally does not produce an undesired minimum service application. For larger residual durations, larger vertical G-forces result during the residual 4.6 milliseconds of 5.2 milliseconds producing undesirable minimum service brake application. Vertical acceleration produced by horizontal impact in the range of approximately plus and minus ±15 Gs has been observed.

This increased vertical force, that the differential motion between the service piston and the housing will cause the service piston to operate the quick service chamber check valve in the downward motion of the oscillating valve. This opening, even though for short periods of time, has been sufficient to trigger a minimum service application. Thus in addition to the previously recognized horizontal buff and draft forces, the control valve is also subjected to significant vibration and vertical shock components during slack action.

The present design provides a service valve which less sensitive to mechanically produced vibrations. The brake control valve includes a housing, a quick braking chamber and a piston subject to brake pipe pressure on one side of the piston. A bore in the housing connects the quick braking chamber at a first end and the one side of the piston at a second end. A first valve is in the housing at the first end of the bore. A first operator is in the bore for opening the first valve for a range of positions of the piston. The bore has a first portion of a first diameter and a second portion of a second diameter larger than the first diameter. The first bore portion connects the one side of the piston to the second bore portion. A first operator in the bore is connected to the piston. A seal on the first operator is dimensioned to form a seal with the first bore portion and not with the second bore portion. The seal is located on the operator to lie in the first bore portion for a first segment of the range of piston positions and to lie in the second bore portion for a second segment of the range of piston positions.

A second valve in the housing connects a brake cylinder port with a reservoir port when opened. A second operator in the housing is connected to the first operator for opening the second valve in the second segment of the range of piston positions.

The bore includes a third bore portion connecting the second bore portion to the first valve and of a third diameter and a second port is connected to the quick braking chamber. The first operator has a tip portion of a fourth diameter substantially equal to the third diameter and has an adjacent portion of a fifth diameter smaller than the fourth diameter. The tip portion has a length less than the first segment of the range.

The bore may include a tapered bore portion between the first and second bore portions and the seal lies in the tapered bore portion for a portion of the second segment of the range of piston positions.

A kit includes a bushing and a first operator which is to be connected to a piston of the brake control valve and is to extend from the piston through a bore of the bushing from a first end of the bore to a valve seat at a second end of the busing. The bore has a first bore portion of a first diameter adjacent the first end of bore and a second portion of a second diameter larger than the first diameter adjacent the second end of bore. A seal on the first operator is dimensioned to form a seal with the first bore portion and not with the second bore portion. The seal is located on the operator to lie in the first bore portion for a first segment of a range of piston positions and to lie in the second bore portion for a second segment of the range of piston positions.

The bore may include a third bore portion connecting the second bore portion to the valve seat and of a third diameter and a second port is connected and axial to the bore. The first operator has a tip portion of a fourth diameter substantially equal to the third diameter and has an adjacent portion of a fifth diameter smaller than the fourth diameter. The tip portion has a length less than the first segment of the range.

The bore may include a tapered bore portion between the first and second bore portions and the seal lies in the tapered bore portion for a portion of the second segment of the range of piston positions.

Other objects, advantages and novel features of the present invention will become apparent from the following detailed description when considered in conjunction with the accompanying drawings.

DETAILED DESCRIPTION OF THE DRAWINGS

Figure 1:
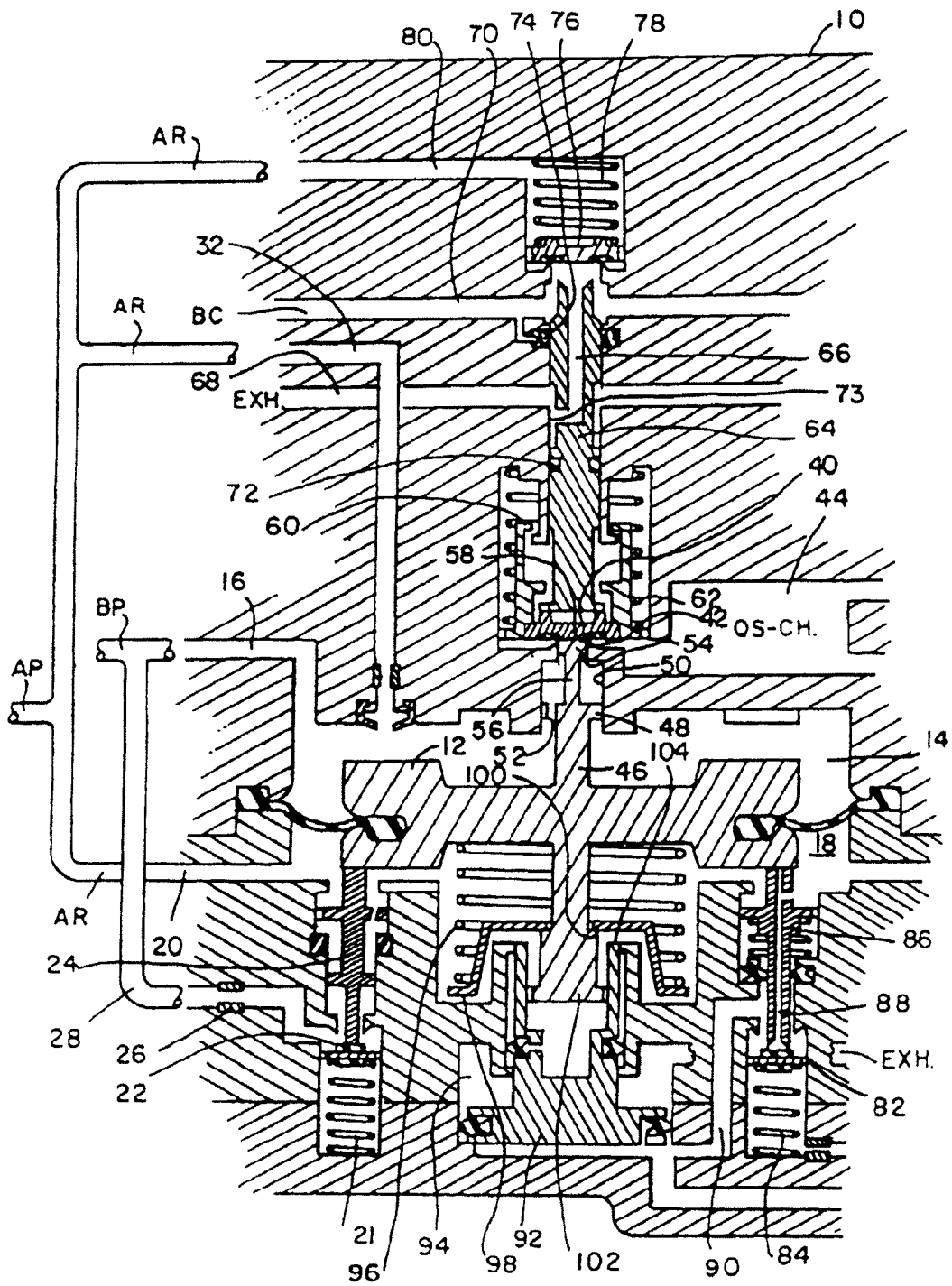
FIG. 1 is a schematic view of a portion of a service portion of a brake control valve in the charging lap position according to the prior art.

The present design is being described with respect to an improvement on a DB-60 control valve available from New York Air Brake Corporation, a unit of Knorr Brake Holding Corporation, of Watertown, N.Y. A detailed description of the complete DB-60 control valve is found in instruction manual MU-21 available from New York Air Brake. Although the improvement has been incorporated into the service section of the DB-60, the present improvement may be provided to any brake control valve portion which includes a piston responsive to brake pipe pressure on one side thereof. Thus, the present design may be used in other AAR styled brake control valves or non-AAR brake control valves. Only those portions of the service section of the DB-60 which explain the operation of the present invention have been included in the schematics and others have been intentionally deleted for sake of clarity.

The brake control valve includes a housing 10 having a service piston 12 with brake pipe pressure in the top chamber 14 connected to the brake pipe BP by passage 16. The bottom chamber 18 on the other side of the piston 12 is connected to the auxiliary reservoir AR through passage 20. An auxiliary reservoir charging valve 22 is controlled by the piston 12 through operator 24 and includes spring 21. The auxiliary reservoir charging valve 22 is connected to the brake pipe BP by sensitivity choke 26 in passage 28. A stability choke 30 connects the brake pipe chamber 14 on the top of diaphragm 12 to the auxiliary reservoir AR by passage 32. Whereas the sensitivity choke 26 interconnects the two chambers 14 and 18 of the piston 12 as long as the auxiliary reservoir charging valve 22 is open, the stability choke 30 interconnects the two chambers 14, 18 for all service positions of the service piston 12 and is closed off in the emergency position of the service position 12. The restrictions 26 and 30 define the sensitivity of the service position 12 against pneumatic noises in the brake pipe.

A quick service inlet valve 40 includes a seat 42 and connects the top or brake pipe chamber 14 of piston 12 to the quick service chamber or volume 44. Operator 46, extending from the service piston 12, includes a guide portion 48 moving within bore 50 of the housing. A passage 52 in the guide 48 connects the brake pipe chamber 14 of the piston 12 to the bore 50. A smaller bore 58 connects bore 50 to the valve seat 42. The operator 46 includes a first portion 54 of a first cross-sectional area or diameter and a second contiguous portion 56 of a second cross-sectional area or diameter smaller than the first cross-sectional area 54. The first portion 54 engages the quick service inlet valve 40. Portions 54 and 56 define restrictions between themselves and the bore 58. The restriction formed by portion 54 is sufficiently small so as to minimize the flow to the quick service chamber 44, whereas the restriction formed between bore 58 and portion 56 permits a flow rate to provide normal operation of the quick service inlet valve 40.

The cross-section of the portion 54 and 56 of the actuator has been exaggerated in the drawings to illustrate the present invention. For example, the bore 58 would have a diameter of approximately 5.02 millimeters, the fast portion 54 would have a diameter of 4.92 millimeters and the portion 56 would have a diameter of 4.69 millimeters. The effective length of the first section 54 would be approximately 1.5 millimeters (2.0 millimeters less 0.5 millimeters of the valve seat 42). Thus, for the first 1.5 millimeters of travel of the piston 12 during the opening of the quick service inlet valve 40, the flow through the open valve 40 is defined by the restriction between the first portion 54 and the bore 58. For the remainder of the travel of the piston 12, the flow is defined by the restriction between the second portion 56 and the bore 58.

This design provides 75 percent less annular area during the initial 1.5 millimeters of travel and 140 percent more annular area during subsequent travel than the standard design. The restriction between portion 54 and bore 58 is selected to be insufficient to reduce the brake pipe pressure in chamber 14 to cause the piston 12 to become unstable and assume a braking position.

A spring cage 60 connects a spring 62 to the quick service inlet valve 40 and biases it closed. A slide or second operator 64 is operatively connected to the quick service inlet valve 40, and includes a passage 66, which in FIG. 1 connects exhaust EXH through passage 68 in the housing to the brake cylinder by passage 70 in the housing. O ring 72 and K ring 74 on the slide 64 seals the slide in the bore 73 of the housing. A brake cylinder inlet valve 76 including spring 78 connects the brake cylinder passage BC 70 to the auxiliary reservoir via passage 80. The slide 64 operates the brake cylinder valve 76 in response 35 to the quick service inlet valve 40.

A balancing valve 82 with spring 84 includes an operator 86 which is controlled by the service piston 12. A passage 88 in the operator 86 connects the auxiliary reservoir chamber 18 at the bottom of service piston 12 to a balancing piston 92 via passage 90, when the balancing valve 82 is closed and passage 88 is opened. The balancing piston 92 has chamber 94 on its top side connected to exhaust EXH. A spring 96 resting on spring cage 98 biases the service system 12 towards its braking position. The spring cage 98 rests on shoulder 100 of an element 102 connected to the service piston 12. An extension 104 of the balancing piston 102 will engage the spring cage 98 to change the biasing of the spring 96.

The details of the operation of the brake valve illustrated in FIG. 1 are described in U.S. Pat. No. 5,387,030.

Figure 2:
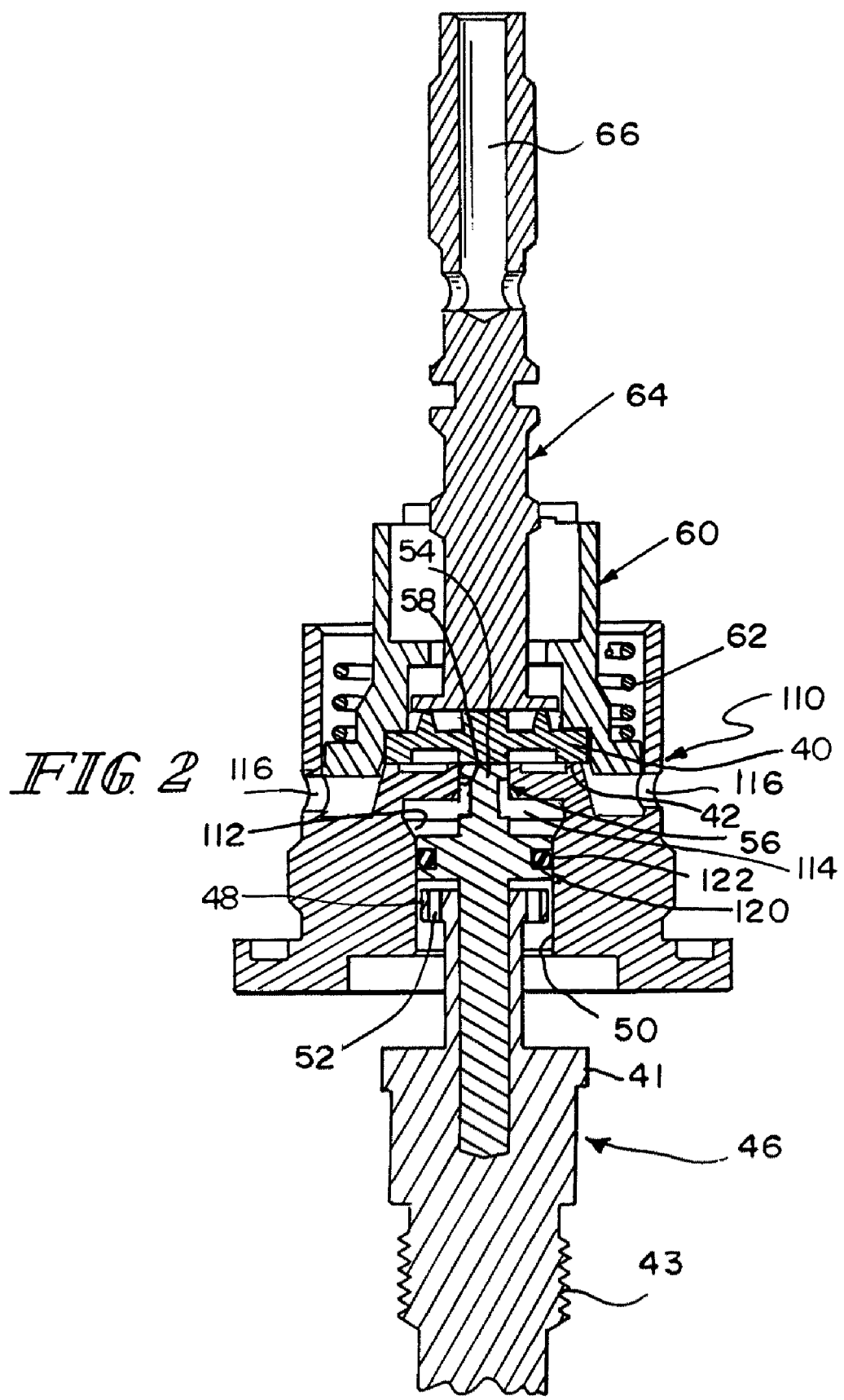
FIG. 2 is a cross-sectional view of a kit including a bushing, first and second operators and a piston stem according to the present design

As illustrated in FIG. 2, a shoulder 41 of operator or piston stem 46 receives the plates of the diaphragm 12 which are secured thereto by a nut, not shown, which is received on the threaded portion 43 of piston stem 46. The guide 48 rides in the bore portion 50. The guide 48 may or may not include the passages 52.

The piston stem 46 receives the first operator or actuator having the portions 54 and 56. In the illustrated operator, the diameter of the portions 54 and 56 are the same and correspond to the diameters of FIG. 1. The first operator includes an enlarged diameter portion 120 with a seal 122 on the circumference thereof. Although the seal 122 is shown as an O-ring, it may also be a K-ring. The portion 120 has a larger diameter than the portions 54 and 56.

A bushing 110 includes the bore portions 50 and 58 connected by bore portions 112 and 114. The bore portion 114 is a tapered transition between the larger bore portion 112 and the bore portion 50. The operator portion 120 and seal 122 are dimensioned to form a seal with the bore portion 50 and not with the bore portions 112 and 114. The operator portion 120 and seal 122 located on the operator to lie in the bore portion 50 for a first segment of the range of piston positions and to lie in the bore portions 112 and 114 for a second segment of the range of piston positions.

Figure 3:
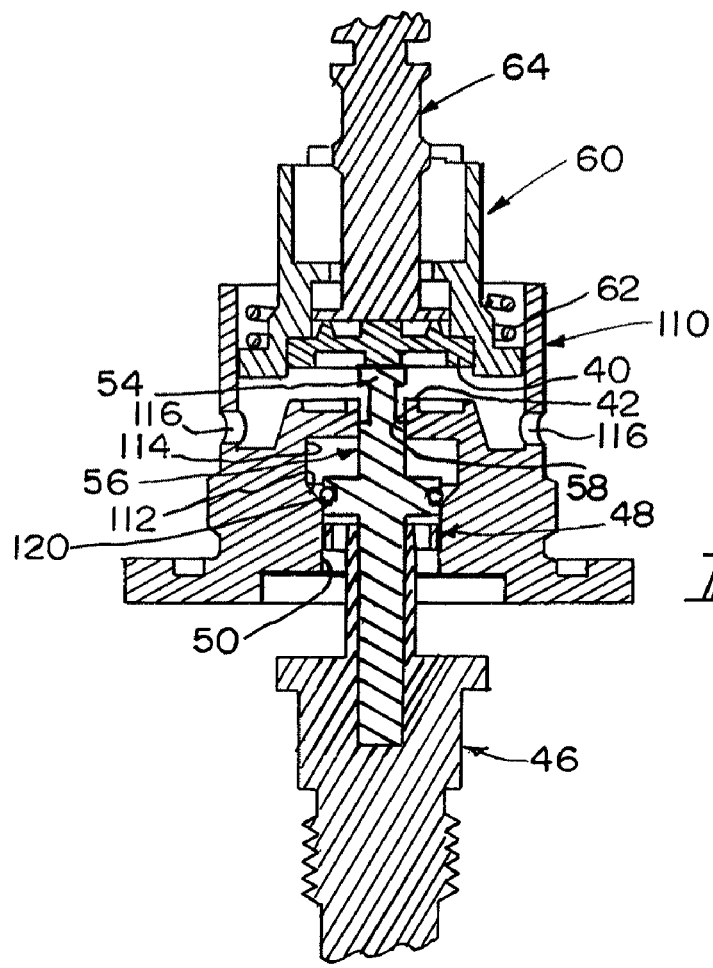
FIG. 3 is a schematic view of FIG. 1 with the kit of FIG. 2 in the first stage of quick service.
Figure 4:
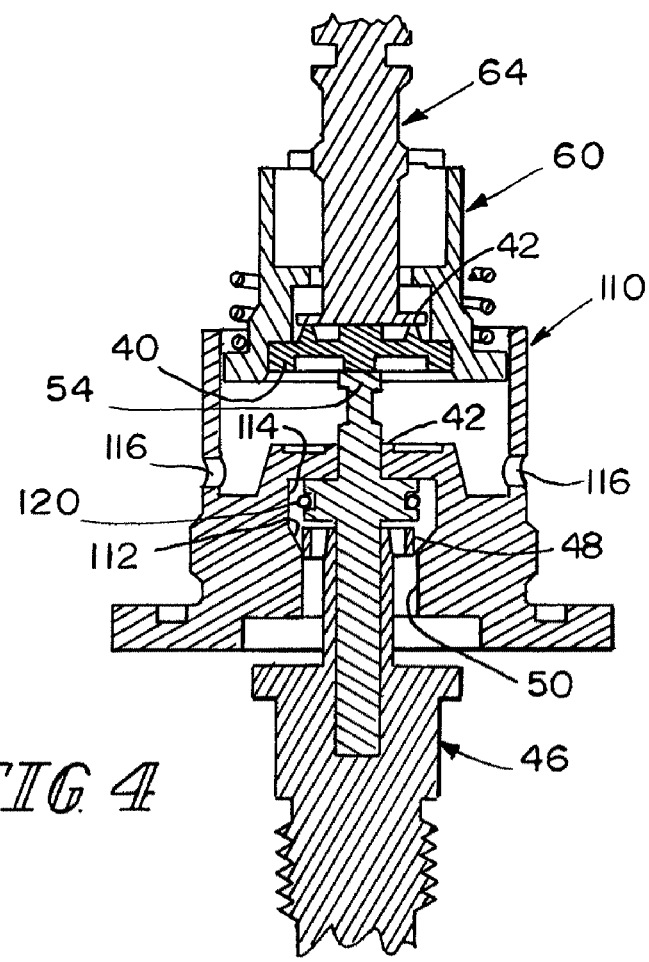
FIG. 4 is a schematic view in a second stage of quick service.

In addition to the port at the end of bore portion 58, the bushing includes ports 116 connected to the quick service chamber 44. The quick service inlet valve 40 is received on valve seat 42 on the bushing 110. The top chamber 14 of the piston 12 is connected to the quick service chamber 44 only when the operator portion 120 does not form a seal with the bore portion 50. This is illustrated in FIGS. 3 and 4. The connection is mainly through ports 116 with a secondary connection through bore portion 58. If the operator includes the portions 54 and 56 of FIG. 1, the secondary connection flow is increased.

For small or first segment of the range of upward movement of the piston 12 and the operator 56, the operator portion 120 moves in and maintains a seal with the bore portion 50. The end 54 of the operator 56 moves the valve 40 off the valve seat 42 and the slide or second operator 56 in the first segment. Thus even though the valve 40 is lifted off the valve seat 42, there is no air flow through the valve seat 40. The operator 64 not in contact with the brake cylinder inlet valve 76 and the passage 66 connects the brake cylinder passage 70 with the exhaust passage 68.

At the beginning of a second segment of the range of upward movement of the piston 12 and the operator 56, the operator portion 120 moves in the tapered bore portion 112 and breaks the seal. This is shown in FIG. 3. Air from the top chamber 14 of the piston 12 slowly flows at a first rate mainly through bore portion 58 because of the taper. This begins the acceleration of the pressure drop in the top chamber 14 and results in further upward movement of the piston 12 and the operator 56.

The operator 64 comes in contact with the brake cylinder inlet valve 76 and seals the passage 66. This is the lap position cutting the brake cylinder passage 70 from exhaust passage 68 and the auxiliary reservoir passage 80.

With further upward movement in the second segment of the range of upward movement of the piston 12 and the operator 56, the operator portion 120 moves in the large bore portion 114 and with unrestricted flow around the operator portion 120. This is shown in FIG. 4. Air from the top chamber 14 of the piston 12 freely flows at a second higher rate through the bore portion 58. This further increases acceleration of the pressure drop in the top chamber 14 and results in quicker upward movement of the piston 12 and the operator 56. This further upward movement of the piston 12, operator 56 and operator 64 opens the brake cylinder inlet valve 76 connects the brake cylinder passage 70 and the auxiliary reservoir passage 80.

The bushing 110 and the first operator 56 may be provided as a kit used to upgrade existing brake control valves. No modification of the housing 10 in the other portions of the brake control valve is required.

The present design decreases the sensitivity of the brake control valve to vibration induced motion of the piston. Although the present disclosure has been described and illustrated in detail, it is to be clearly understood that this is done by way of illustration and example only and is not to be taken by way of limitation. The scope of the present disclosure is to be limited only by the terms of the appended claims.

What is claimed:

1. A brake control valve for operating a vehicle's air brakes in response to brake pipe pressure in a brake pipe, the brake control valve comprising:
    a housing including a quick braking chamber;
    a piston in the housing and subject to brake pipe pressure on one side of the piston;
    a bore in the housing connecting the quick braking chamber at a first end and the one side of the piston at a second end;
    a first valve in the housing at the first end of the bore;
    a first operator in the bore for opening the first valve for a range of positions of the piston;
    the bore having a first bore portion of a first diameter and a second portion of a second diameter larger than the first diameter, the first bore portion connecting the one side of the piston to the second bore portion;
    a seal on the first operator dimensioned to form a seal with the first bore portion and not with the second bore portion; and
    the seal is located on the operator to lie in the first bore portion for a first segment of the range of piston positions and to lie in the second bore portion for a second segment of the range of piston positions.

2. The brake control valve according to claim 1, including a second valve in the housing connecting a brake cylinder port with a reservoir port when opened and a second operator in the housing for opening the second valve after the first valve is opened.

3. The brake control valve according to claim 2, wherein the second operator is configured to open the second valve only in the second segment of the range of piston positions.

4. The brake control valve according to claim 2, wherein the bore includes a third bore portion connecting the second bore portion to the first valve and of a third diameter; the first operator has a tip portion of a fourth diameter substantially equal to the third diameter and has an adjacent portion of a fifth diameter smaller than the fourth diameter; and the tip portion has a length less than the first segment of the range.

5. The brake control valve according to claim 1, wherein the bore includes a third bore portion connecting the second bore portion to the first valve and of a third diameter; the first operator has a tip portion of a fourth diameter substantially equal to the third diameter and has an adjacent portion of a fifth diameter smaller than the fourth diameter; and the tip portion has a length less than the first segment of the range.

6. The brake control valve according to claim 5, wherein the bore includes a tapered bore portion between the first and second bore portions and the seal lies in the tapered bore portion for a portion of the second segment of the range of piston positions.

7. The brake control valve according to claim 1, wherein the bore includes a tapered bore portion between the first and second bore portions and the seal lies in the tapered bore portion for a portion of the second segment of the range of piston positions.

* * * * *